US011193019B2

(12) United States Patent
Wilhelmus et al.

(10) Patent No.: US 11,193,019 B2
(45) Date of Patent: Dec. 7, 2021

(54) THERMOPLASTIC POLYMER POWDER FOR SELECTIVE LASER SINTERING (SLS)

(71) Applicant: INEOS STYROLUTION GROUP GMBH, Frankfurt am Main (DE)

(72) Inventors: Bianca Wilhelmus, Hanau (DE); Norbert Niessner, Friedelsheim (DE); Viktor Wiebe, Gummersbach (DE); Frank Eisentraeger, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

(21) Appl. No.: 16/330,581

(22) PCT Filed: Sep. 7, 2017

(86) PCT No.: PCT/EP2017/072425
§ 371 (c)(1),
(2) Date: Mar. 5, 2019

(87) PCT Pub. No.: WO2018/046582
PCT Pub. Date: Mar. 15, 2018

(65) Prior Publication Data
US 2021/0277232 A1    Sep. 9, 2021

(30) Foreign Application Priority Data
Sep. 8, 2016  (EP) .................... 16187807

(51) Int. Cl.
*C08L 77/02*    (2006.01)
*C08L 55/02*    (2006.01)
(Continued)

(52) U.S. Cl.
CPC ............ *C08L 77/02* (2013.01); *B29C 64/153* (2017.08); *B29C 64/314* (2017.08); *B33Y 10/00* (2014.12);
(Continued)

(58) Field of Classification Search
CPC ...... C08L 77/02; C08L 55/02; C08L 2203/30; C08L 2205/025; B33Y 10/00;
(Continued)

(56) References Cited

U.S. PATENT DOCUMENTS 5,804,629 A    9/1998  Weber et al.
6,218,467 B1   4/2001  Wicker et al.
(Continued)

FOREIGN PATENT DOCUMENTS

CN    101319075 A    12/2008
CN    101597425 A    12/2009
(Continued)

OTHER PUBLICATIONS

English translation of International Preliminary Report on Patentability in International Application No. PCT/EP2017/072425, dated Mar. 21, 2019.

*Primary Examiner* — Nahida Sultana
(74) *Attorney, Agent, or Firm* — J.A. Lindeman & Co. PLLC

(57) ABSTRACT

The present invention relates to a thermoplastic polymer powder and to the use thereof as material for selective laser sintering (SLS). The polymer powder contains a partially crystalline polymer, an amorphous polymer and a compatibilizing agent, and optionally additional additives and/or auxiliary substances, wherein the partially crystalline polymer, the amorphous polymer and the compatibilizing agent are in the form of a polymer blend. The invention also relates to a method for producing the thermoplastic polymer powder and to a method of selective laser sintering (SLS).

12 Claims, 1 Drawing Sheet a)

b)

(51) Int. Cl.
  *B33Y 10/00* (2015.01)
  *B33Y 70/00* (2020.01)
  *B33Y 40/10* (2020.01)
  *B29C 64/314* (2017.01)
  *B29C 64/153* (2017.01)
  *B29K 101/12* (2006.01)

(52) U.S. Cl.
  CPC .............. *B33Y 40/10* (2020.01); *B33Y 70/00* (2014.12); *C08L 55/02* (2013.01); *B29K 2101/12* (2013.01); *B29K 2995/0026* (2013.01); *B29K 2995/0029* (2013.01); *C08L 2203/30* (2013.01); *C08L 2205/025* (2013.01)

(58) Field of Classification Search
  CPC ....... B33Y 70/00; B33Y 40/10; B29C 64/314; B29C 64/153; B29K 2101/12; B29K 2995/0026; B29K 2995/0029
  See application file for complete search history.

(56) References Cited

U.S. PATENT DOCUMENTS

| | | |
|---|---|---|
| 2003/0153677 A1 | 8/2003 | Warth et al. |
| 2003/0181582 A1 | 9/2003 | Warth et al. |
| 2003/0181591 A1 | 9/2003 | Warth et al. |
| 2011/0129682 A1 | 6/2011 | Kurata et al. |
| 2011/0319550 A1* | 12/2011 | Weber .................... C08L 25/08 524/514 |
| 2014/0121327 A1 | 5/2014 | Schmidt et al. |
| 2015/0087784 A1* | 3/2015 | Weber .................... C08L 77/02 525/66 |
| 2018/0094122 A1* | 4/2018 | Niessner ................. B32B 19/02 |
| 2018/0155510 A1* | 6/2018 | Niessner ................. C08L 33/20 |

FOREIGN PATENT DOCUMENTS

| | | |
|---|---|---|
| CN | 105400192 A | 3/2016 |
| CN | 105566894 A | 5/2016 |
| DE | 4407485 A1 | 9/1995 |
| DE | 10024935 A1 | 11/2001 |
| DE | 102012015804 A1 | 5/2014 |
| EP | 0784080 A1 | 12/1996 |
| EP | 0755321 B1 | 11/1997 |
| EP | 2393877 B1 | 1/2010 |
| EP | 2802620 B1 | 12/2012 |
| WO | 96/06881 A2 | 3/1996 |
| WO | 98/27157 A1 | 6/1998 |
| WO | 2005/040381 A1 | 5/2005 |
| WO | 2005/090056 A1 | 9/2005 |
| WO | 2010/089245 A1 | 8/2010 |
| WO | 2015/081001 A1 | 6/2015 |
| WO | 2016/048357 A1 | 3/2016 |

\* cited by examiner

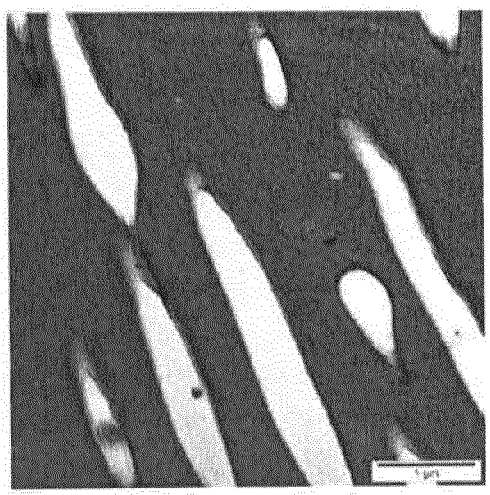 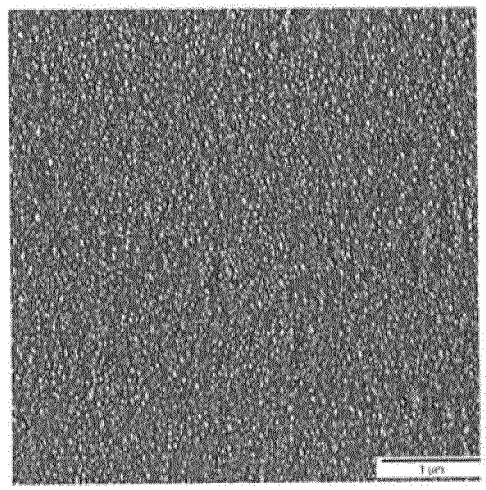
a)  b)

THERMOPLASTIC POLYMER POWDER FOR SELECTIVE LASER SINTERING (SLS)

The present invention relates to a thermoplastic polymer powder and to its use as material for selective laser sintering (SLS). The polymer powder comprises a semicrystalline polymer, an amorphous polymer and a compatibilizer, and also optionally further additives and/or auxiliaries. The semicrystalline polymer, the amorphous polymer and the compatibilizer are present in the form of a polymer blend in the polymer powder. The invention moreover relates to a process for the production of a thermoplastic polymer powder and to a process for selective laser sintering (SLS) with use of the polymer powder of the invention.

The selective laser sintering (SLS) process is what is known as an additive manufacturing process (AM). A feature of additive manufacturing processes such as selective laser sintering (SLS) and fused deposition modeling (FDM) is in particular that no mold is required for the manufacture of the component. Additive manufacturing processes are typically used for the production of small numbers of units, for example prototypes, patterns and models (another term used for this being "rapid prototyping").

Selective laser sintering (SLS) is a powder-bed process wherein thin layers of a polymer powder, the thickness of these typically being about 100 µm, are provided in a construction chamber and melted in localized manner with the aid of a laser beam. In related processes, the melting can be achieved by means of infrared radiation or by means of UV radiation (e.g. UVLED). The layer-by-layer melting and hardening of the powder particles (sintering) produces the component by bonding the individual layers. The process of selective laser sintering, and suitable polymer powders, are described inter alia in Schmid, M., Selektives Laserintern (SLS) mit Kunststoffen [Selective laser sintering (SLS) with plastics] (Carl Hanser Verlag, Munich, 2015).

The SLS process typically takes place in a heated construction chamber. In the usual procedure, after the application of a powder layer in the construction chamber, for example by means of a doctor or roller, irradiation with a laser beam is used to introduce energy at the locations requiring melting. A $CO_2$ laser is often used, or a Nd:YAG laser or a fiber laser. The intention is ideally that there is no concomitant melting of the adjacent polymer particles. After the localized melting of the polymer particles, the polymer material resolidifies and forms a portion of the required component.

After the complete melting and subsequent resolidification of a component layer, the construction chamber is generally lowered, a new powder layer is applied, and the construction procedure is repeated. The desired component can thus be produced layer-by-layer via repeated application of new layers and selective melting. Unmelted powder is typically removed from the component after conclusion of the construction process and after cooling of the construction chamber.

In principle, selective laser sintering can use semicrystalline or amorphous polymers. Preferred polymers used in SLS are semicrystalline, because these have a defined melting point or melting range and thus permit construction of defined components with satisfactory mechanical properties. However, it is also possible to use amorphous polymers, but amorphous polymers typically give components that are not densely sintered, but instead are porous, because amorphous polymers have no defined melting point, instead having a glass transition temperature and a softening range. Components made of amorphous polymers, for example from amorphous polystyrene, are generally porous, with unsatisfactory mechanical strength, and therefore are mainly used as patterns for casting.

SLS uses mainly polyamides (PA), but it is also possible to process polypropylene (PP), polyoxymethylene (POM), polylactide (PLA) or polystyrene (PS) to give components by means of selective laser sintering (SLS). SLS processes using various polymers are described inter alia in WO 96/06881, the intention here being as far as possible to produce dense components.

The polymer powders used in SLS are subject to particular requirements which are aimed firstly at the properties of the polymer (for example mechanical and optical properties, and also behavior of the polymer melt) and secondly are aimed at the nature of the polymer powder (for example particle size, particle size distribution, and flowability).

The average particle size (particle diameter) of the polymer powder for use in SLS must be less than the thickness of the layer applied in the construction chamber, typically below 200 µm, preferably below 100 µm. A particle size distribution of the polymer powder that is uniform and not excessively broad is moreover generally advantageous for the quality of the component. In particular, a decisive factor for the use in SLS is ability to apply the individual polymer powder layers in a manner that is satisfactory and uniform.

Another important factor is ability to achieve good compaction of the polymer powder, thus permitting production of components with high density and good mechanical properties. In particular, particle size and particle size distribution are decisive factors in achieving component structures with the best possible resolution.

During the construction process it is advantageous to heat the construction chamber to a temperature extending to just below the melting point of the semicrystalline polymer or just below the glass transition temperature of the amorphous polymer, so that the laser beam itself is then required to introduce only a small portion of the energy needed for the melting procedure. When semicrystalline polymers are used premature crystallization and excessive warpage are advantageously avoided by heating the construction chamber to a temperature above the crystallization temperature of the semicrystalline polymer.

When amorphous polymers are used, it is generally not permissible to raise the temperature of the construction chamber above the glass transition temperature, the aim here being to avoid premature melting.

The materials currently most frequently used for selective laser sintering are polyamides, in particular polyamide 12 (abbreviated to PA12; polylaurolactam). However, polyamides, in particular PA12, have some serious disadvantages. Polyamides have a low recycling factor in SLS. The unsintered polymer powder is normally removed from the finished component after a construction process and, as far as possible, reused in further construction cycles. This reuse (recycling) is however in practice subject to significant restriction, because long construction cycle times and high temperatures in the construction chamber change the nature of the polymer powder. This thermal stress in particular impairs the flowability of the polymer powder. It is therefore generally necessary to add large proportions of fresh polymer powder, and it is often necessary to discard a large proportion of the used polymer powder. The recycling factor is the proportion of the polymer powder reused in the process.

A further disadvantage in the use of polyamides in SLS processes is the long construction cycle time resulting from the need for slow cooling. Because components made of polyamide, in particular PA12, exhibit significant volume shrinkage (warpage) during cooling of the component, it is necessary to cool the construction chamber slowly to room temperature after the construction cycle, and this significantly increases the total cycle time.

Desirable conditions for shortening the cooling phase are firstly a construction chamber temperature that is as low as possible and secondly low volume shrinkage of the polymer during cooling.

The mechanical properties of components made of polyamide, for example PA12, also continue to lag behind those that can be achieved with other production methods, for example injection molding. It would therefore be desirable to provide a polymer powder which is amenable to better compaction during selective laser sintering and can give components with improved mechanical properties. Components with smoother surfaces are moreover often desirable.

CN-B 101319075 and US 2014/0121327 describe processes for the production of three-dimensional components made of amorphous polymers by selective sintering. WO 2016/048357 describes a process similar to selective laser sintering. A light-absorbing additive is applied here to the powder bed at the locations requiring printing, and this then absorbs, from the radiation, for example from an LED, the energy needed for melting of the polymer, and passes this onward to the polymer that is to be melted.

CN-B 101319075 describes the use of amorphous SAN copolymer for the production of patterns for casting by means of SLS, but the components here have undesired high porosity.

US 2014/0121327 mentions, as a further disadvantage of amorphous polymers, high melt viscosity which makes it necessary, in order to permit fusion of the particles, to use the laser beam to heat the polymer significantly beyond the glass transition temperature. This then makes it impossible to achieve clear delimitation of the region to be melted, and high-porosity components are obtained.

The prior art also reveals additive manufacturing processes in which a polymer powder consisting of a plurality of different polymers is used. However, the processes described are typically restricted to polymers which are miscible with one another on a molecular level. The polymer-blend powders, or the components produced therefrom, moreover continue to have the disadvantages described above.

DE-A 10 2012 015 804 describes polymer powders as material for additive manufacturing by layer-by-layer melting in a heated construction chamber.

The powder is a mixture (blend) made of two or more polymers miscible on a molecular level, and in particular blends of semicrystalline polymers are described as advantageous here, examples being PA11/PA12, PA6/PA610, PP/POM/PLA and PP/PA12.

EP-B 0 755 321 describes a process for the production of a three-dimensional object, for example by means of SLS, where blends of copolymers and polymers molecularly miscible with one another are used. The components are mixed in the melt, whereupon mixing of the polymers on a molecular level takes place.

US 2011/0129682 and WO 2015/081001 describe SLS processes with use of a combination of polyolefins (PP and PE) and of hydrogenated styrene-butadiene block copolymers. These blends, however, exhibit only a slight improvement on mechanical properties in comparison with unblended polypropylene and in comparison with polyamide 12.

It is an object of the present invention to provide, for selective laser sintering (SLS) and for comparable technologies, for example as described in WO 2016/048357, a polymer powder with which it is possible to eliminate the disadvantages described above of the prior art. The intention is in particular to produce components which have little susceptibility to warpage and have good mechanical properties and surface properties. It is moreover intended that use of the polymer powder of the invention permits shortening of the construction time, in particular of the cooling time, so that energy and time can be saved and a higher proportion of the polymer powder can be reused in the process (high recycling rate).

A further object of the invention consists in the provision of a thermoplastic polymer powder which is suitable for the production of translucent (light-permeable) or transparent components by means of selective laser sintering, in particular with realization of the abovementioned advantages.

Said objects are achieved via the thermoplastic polymer powders of the invention comprising a semicrystalline component A, an amorphous component B and a compatibilizer C. Surprisingly, it has been found that blends of semicrystalline and amorphous polymers compounded (mixed) together with a compatibilizer can be used particularly advantageously in selective laser sintering and comparable technologies.

With use of the polymer powders of the invention, comprising at least one semicrystalline polymer, at least one amorphous polymer and at least one compatibilizer, in selective laser sintering it is possible to produce components with advantageous mechanical strength, little warpage and good surface quality.

In particular, it has been found that polymer powders comprising a semicrystalline polymer (preferably polyamide), an acrylonitrile-butadiene-styrene copolymer (ABS) or a styrene-acrylonitrile copolymer (SAN) as amorphous polymer, and a suitable compatibilizer can be used advantageously in laser sintering. Use of free-flowing styrene copolymer with good melting properties, for example an ABS, as amorphous component in particular permits production of a component with low porosity.

Polymeric blends of polyamides and amorphous polymers, in particular amorphous styrene copolymers, are known and are described by way of example in EP-B 2 802 620 and EP-B 2 393 877. Binary polymer blends of polyamides and styrene copolymers (e.g. SAN or ABS) have very low toughness, because the components are incompatible. Use of functionalized styrene-acrylonitrile copolymers (SAN copolymers) as compatibilizers can significantly increase the toughness of the blends. These polymer blends moreover have interesting properties, for example high impact resistance, good flowability, chemicals resistance and high surface quality. Suitable compatibilizers are especially styrene-acrylonitrile-maleic anhydride terpolymers, styrene-N-phenylmaleimide-maleic anhydride terpolymers and methyl methacrylate-maleic anhydride copolymers.

The present invention provides a thermoplastic polymer powder P comprising:
(A) from 10 to 89.9% by weight, preferably from 30 to 66% by weight, based on the entire polymer powder P, of at least one semicrystalline polymer A, preferably selected from polyamides (PA), polyetherketones (PEK), polylactides (PLA), polybutylene terephthalate (PBT), polyethylene (PE), polypropylene (PP) and syndiotactic polystyrene (PS); with particular preference of at least one polyamide selected from PA6 (polycaprolactam); PA6,6 (polyhexamethyleneadipamide);

PA4,6 (polytetramethyleneadipamide); PA5,10 (polypentamethyleneadipamide); PA6,10 (polyhexamethylenesebacamide); PA7 (polyeneantholactam); PA11 (polyundecanolactam) and PA12 (polydodecanolactam, polylaurolactam);

(B) from 10 to 89.9% by weight, preferably from 30 to 66% by weight, based on the entire polymer powder P, of at least one amorphous polymer B, preferably selected from styrene copolymers, styrene-butadiene block copolymers, poly(meth)acrylates, amorphous polystyrene, and impact-modified polystyrene (HIPS);

(C) from 0.1 to 15% by weight, preferably from 1 to 10% by weight, based on the entire polymer powder P, of at least one compatibilizer C, selected from the group consisting of styrene-acrylonitrile-maleic anhydride terpolymers, styrene-N-phenylmaleimide-maleic anhydride terpolymers and methylmethacrylate-maleic anhydride copolymers;

(D) optionally from 0 to 5% by weight, preferably from 0 to 3% by weight, based on the entire polymer powder P, of at least one additive and/or auxiliary, preferably selected from the group consisting of antioxidants, UV stabilizers, stabilizers to counter decomposition by heat, peroxide-decomposing substances, antistatic agents, lubricants, powder-flow aids, mold-release agents, nucleating agents, plasticizers, fibrous or pulverulent fillers, fibrous or pulverulent reinforcing agents, and colorants, such as dyes and pigments;

where the sum of the % s by weight of components A, B, C and optionally D is 100% by weight;

where the semicrystalline polymer A, the amorphous polymer B and the compatibilizer C (together) are present in the form of a polymer blend;

and where the $D_{50}$ median particle diameter of the thermoplastic powder P is in the range from 5 to 200 μm, preferably from 5 to 150 μm, with particular preference from 20 to 100 μm, particularly preferably from 30 to 80 μm.

The expression "semicrystalline polymer" for the purposes of the present invention means a polymer which comprises a certain proportion of crystalline domains which consists of polymer chains arranged in structured fashion. The degree of crystallinity (proportion by weight or molar proportion of the crystalline domains, based on the entire polymer) of a semicrystalline polymer is typically in the range from 10 to 80%. The proportion of the crystalline domains can by way of example be determined with the aid of known thermal analysis methods (e.g. differential scanning calorimetry DSC, differential thermal analysis DTA), or by X-ray structure analysis.

Semicrystalline polymers feature a glass transition temperature mostly a melting point that is relatively well defined.

The expression "amorphous polymer" means for the purposes of the present invention a polymer which has no, or no determinable, proportion of ordered, crystalline domains. In particular, the degree of crystallinity of an amorphous polymer is below 10%, preferably below 1%. Amorphous polymers generally have a glass transition temperature and a broad softening range.

The expression "polymer blend" means for the purposes of the present invention a macroscopically homogeneous mixture of a plurality of different polymers. In particular, a polymer blend is produced by mixing of the different polymers (A, B and C) in the melt.

The expression "polymer or copolymer comprising or produced from monomer or monomers X" is understood by the person skilled in the art to mean that the structure of the polymer or copolymer is composed, in random, blockwise or other arrangement, of the units corresponding to the specified monomers X. Correspondingly, the person skilled in the art understands by way of example the expression "acrylonitrile-butadiene-styrene copolymer (ABS)" to mean polymer comprising or composed of the monomer units based on acrylonitrile, butadiene and styrene. The person skilled in the art is aware that polymers and copolymers can normally comprise a small quantity of other structures, for example starter groups and terminal groups, alongside the stated monomer units.

The expression "a selective laser sintering process (SLS)" means for the purposes of the present invention a process of additive manufacturing for the production of a three-dimensional body with the aid of a device suitable for SLS.

Component A

Known semicrystalline thermoplastic polymers can be used as component A of the invention, examples being polyamides, polyoxymethylene (POM), polyetherketones (PEK), polylactides (PLA), semicrystalline polystyrene (isotactic PS and/or syndiotactic PS), polyethylene terephthalate (PET), polybutylene terephthalate (PBT), polyethylene (PE) and polypropylene (PP). The quantity of component A present in the polymer powder is from 10 to 89.9% by weight, preferably from 30 to 66% by weight, often from 35 to 60% by weight, based on the entire polymer powder P.

In a preferred embodiment, the semicrystalline polymer A is at least one semicrystalline polyamide (PA). Suitable polyamides are known homo- and copolyamides, and also mixtures thereof.

Suitable semicrystalline homopolyamides are typically obtained via polycondensation of at least one aminocarboxylic acid or of at least one lactam or of at least one diamine with at least one dicarboxylic acid. Suitable diamines are by way of example, alkane- or cycloalkanediamines having from 4 to 12, in particular from 4 to 8, carbon atoms. The at least one diamine can preferably be selected from ethylenediamine; hexamethylenediamine; decamethylenediamine; 2,2,4- and/or 2,4,4-trimethylhexa-methylenediamine; m- and/or p-xylylenediamine; bis(4-aminocyclohexyl)methane; 2,2'-bis(4-aminocyclohexyl)propane; 3,3'-dimethyl-4,4'-diaminodicyclohexylmethane; 3-aminomethyl-3,5,5-trimethylcyclohexylamine; 2,5- and/or 2,6-bis(aminomethyl)norbornane and 1,4-diaminomethylcyclohexane.

Suitable dicarboxylic acids are by way of example alkanedicarboxylic acids having from 6 to 12, in particular from 6 to 10, carbon atoms. It is preferable that the at least one dicarboxylic acid is selected from oxalic acid, 1,4-butanedicarboxylic acid (adipic acid), 1,7-heptanedicarboxylic acid (azelaic acid), decanedicarboxylic acid, heptadecanedicarboxylic acid, 2,2,4- and/or 2,4,4-trimethyladipic acid, 1,3-benzenedicarboxylic acid (isophthalic acid) and 1,4-benzenedicarboxylic acid (terephthalic acid).

Equally suitable as component A are copolyamides which are obtained via polycondensation of three or more different abovementioned monomers, and also copolyamides obtained via polycondensation of the abovementioned monomers with addition of a small proportion, preferably up to about 10% by weight, of other constituents that can be condensed into the polymer, for example aminocarboxylic acids such as 6-aminohexanoic acid (ε-aminocaproic acid), 11-aminoundecanoic acid (ω-aminoundecanoic acid), 12-aminododecanoic acid (ω-aminolauric acid), and/or lactams thereof.

In particular, preference is given to polyamide 6 (polycaprolactam), polyamide 6,6 (polyhexamethyleneadipamide) and polyamide composed of at least 80% by weight of repeating units of the formula -[—NH—(CH$_2$)$_4$—NH—CO—(CH$_2$)$_4$—CO—]-. The last-mentioned polyamides are obtainable via condensation of 1,4-diaminobutane with adipic acid. Suitable production processes for polyamides are described by way of example in EP-A 38 094, EP-A 38 582 and EP-A 39 524.

The molding compositions can moreover comprise a semiaromatic copolyamide as component A, as long as the polymer A has the required crystallinity.

Preferred semiaromatic copolyamides comprise from 40 to 90% by weight of units deriving from terephthalic acid and from hexamethylenediamine. A small proportion of the terephthalic acid, preferably not more than 10% by weight of the total quantity of aromatic dicarboxylic acids used, can be replaced by isophthalic acid or other aromatic dicarboxylic acids, preferably those in which the carboxy groups are in para-position. The semiaromatic copolyamides can moreover comprise units of ε-caprolactam, and also units of adipic acid and hexamethylenediamine; in this case, the proportion of units free from aromatic groups is preferably at least 10% by weight, preferably at least 20% by weight. No particular restriction is placed here on the proportion of units deriving from ε-caprolactam and from adipic acid and hexamethylenediamine.

It is further preferable that the semicrystalline polymer A is at least one semicrystalline polyamide (PA) obtained via ring-opening polymerization of lactams having from 7 to 12 carbon atoms in the ring, in particular caprolactam and/or laurolactam.

It is preferable that the semicrystalline polymer A is at least one polyamide selected from the group consisting of polycaprolactam (PA6), polyhexamethyleneadipamide (PA6,6); polytetramethyleneadipamide (PA4,6), polypentamethyleneadipamide (PA5,10), polyhexamethylenesebacamide (PA6,10), polyenantholactam (PA7), polyundecanolactam (PA11) and polylaurolactam (polydodecanolactam, PA12). It is particularly preferable that polymer A is at least one polyamide (PA) selected from the group consisting of polycaprolactam (PA6), polyhexamethyleneadipamide (PA6,6); polyundecanolactam (PA11) and polylaurolactam (polydodecanolactam, PA12).

Semicrystalline polymer A used in particular can also be a mixture (blend) of the polymers A described, in particular a mixture of the semicrystalline polyamides described.

A commercially obtainable polyamide can typically be used, for example Vestosint® (Evonik Industries), Vestamid® (Evonik Industries), Ultramid® (BASF SE), Miramid® (BASF SE), Zytel (DuPont), Ubesta® (Ube) or Durethan® (Lanxess).

It is also typically possible to use other commercially obtainable semicrystalline polymers as component A of the invention, for example Ingeo® (polylactide, NatureWorks) and/or Xarec® (syndiotactic polystyrene, Idemitsu).

Other selected semicrystalline polymers can be: polyetherketones (PEK), polybutylene terephthalate (PBT), polyethylene (PE) and polypropylene (PP). These polymers are preferably used with compatibilizer C.

Component B

Known amorphous thermoplastic polymers can be used as component B of the invention, in particular known amorphous styrene polymers and/or styrene copolymers. The polymer powder generally comprises from 10 to 89% by weight of component B, based on the entire polymer powder P, preferably from 30 to 66% by weight. The amorphous polymer B is preferably selected from styrene copolymers, styrene-butadiene block copolymers, poly(meth)acrylates, amorphous polystyrene (PS), and impact-modified polystyrene (HIPS).

It is preferable that the amorphous polymer B is a styrene polymer and/or styrene copolymer. The amorphous polymer B is preferably at least one polymer selected from styrene-butadiene block copolymers (SBC), acrylonitrile-butadiene-styrene copolymers (ABS), styrene-acrylonitrile copolymers (SAN), α(alpha)-methylstyrene-acrylonitrile copolymers (AMSAN), acrylate-styrene-acrylonitrile copolymers (ASA), methyl methacrylate-acrylonitrile-butadiene-styrene copolymers (MABS), methyl methacrylate-butadiene-styrene copolymers (MBS), styrene-methyl methacrylate copolymers (SMMA), amorphous polystyrene (PS) and impact-modified polystyrene (HIPS).

The expression "styrene polymer" or "styrene copolymer" means for the purposes of the invention a polymer comprising at least 10% by weight of styrene, with the exception of the semicrystalline styrene polymers (isotactic and syndiotactic polystyrene) described above.

In a preferred embodiment, the amorphous thermoplastic polymer B is an impact-modified polystyrene (also termed rubber-modified polystyrene) (high impact polystyrene resin, HIPS), preferably comprising a polybutadiene rubber and/or comprising a styrene-butadiene rubber. Examples of HIPS polymers that can be used are: INEOS Styrolution® PS HIPS resins (INEOS Styrolution, Frankfurt).

By way of example, at least one styrene copolymer selected from the following group can be used as amorphous thermoplastic polymer B: styrene-butadiene block copolymers (SBC), acrylonitrile-butadiene-styrene copolymers (ABS), styrene-acrylonitrile copolymers (SAN), α(alpha)-methylstyrene-acrylonitrile copolymers (AMSAN), acrylate-styrene-acrylonitrile copolymers (ASA), methyl methacrylate-acrylonitrile-butadiene-styrene copolymers (MABS), methyl methacrylate-butadiene-styrene copolymers (MBS), styrene-methyl methacrylate copolymers (SMMA). The styrene copolymers mentioned are obtainable commercially, for example from INEOS Styrolutio.

In a preferred embodiment, the amorphous polymer B is at least one styrene polymer or styrene copolymer which has a melt volume flow rate in the range from 2 to 60 cm$^3$/10 min, preferably from 5 to 40 cm$^3$/10 min, measured in accordance with ISO 1133 (220° C. and 10 kg load).

It is particularly preferable to use free-flowing styrene copolymers as amorphous polymer B, in particular an acrylonitrile-butadiene-styrene copolymer (ABS) with a melt volume flow rate in the range from 5 to 40 cm$^3$/10 min, preferably from 10 to 30 cm$^3$/10 min (melt volume rate 220° C./10 kg, measured in accordance with ISO 1133).

In a preferred embodiment, the amorphous polymer B is at least one ABS copolymer comprising (preferably consisting of):

B1: from 5 to 95% by weight, preferably from 40 to 80% by weight, of at least one thermoplastic copolymer B1 produced from:
  B1a: from 50 to 95% by weight, preferably from 65 to 80% by weight, particularly preferably from 69 to 80% by weight, based on the copolymer B1, of a monomer B1a selected from styrene, α-methylstyrene and mixtures of styrene with at least one further monomer selected from α-methylstyrene, p-methylstyrene and C$_1$-C$_8$-alkyl (meth)acrylate (e.g. methyl methacrylate, ethyl methacrylate, n-butyl acrylate, tert-butyl acrylate),
  B1b: from 5 to 50% by weight, preferably from 20 to 35% by weight, particularly preferably from 20 to 31% by weight, based on the copolymer B1, of a monomer B1b selected from acrylonitrile and mixtures of acrylonitrile with at least one further monomer selected from methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide), B2: from 5 to 95% by weight, preferably from 20 to 60% by weight, of at least one graft copolymer B2 comprising:
B2a: from 40 to 85% by weight, preferably from 50 to 80% by weight, particularly preferably from 55 to 70% by weight, based on the graft copolymer B2, of at least one graft base B2a which is obtained via emulsion polymerization of:
B2a1: from 50 to 100% by weight, preferably from 80 to 100% by weight, based on the graft base B2a, of butadiene,
B2a2: from 0 to 50% by weight, preferably from 0 to 20% by weight, particularly preferably from 0 to 10% by weight, based on the graft base B2a, of at least one further monomer B2a2 selected from styrene, α-methylstyrene, acrylonitrile, methacrylonitrile, isoprene, chloroprene, $C_1$-$C_4$-alkylstyrene, $C_1$-$C_8$-alkyl (meth)acrylate, alkylene glycol di(meth)acrylate and divinylbenzene;
where the entirety of B2a1+B2a2 provides precisely 100% by weight; and
B2b: from 15 to 60% by weight, preferably from 20 to 50% by weight, particularly preferably from 30 to 45% by weight, based on the graft copolymer B2, of a graft shell B2b, which is obtained via emulsion polymerization in the presence of the at least one graft base B2a of:
B2b1: from 50 to 95% by weight, preferably from 65 to 80% by weight, particularly preferably from 75 to 80% by weight, based on the graft shell B2b, of a monomer B2b1, selected from styrene and mixtures of styrene with at least one further monomer selected from α-methylstyrene, p-methylstyrene and $C_1$-$C_8$-alkyl (meth)acrylate (e.g. methyl methacrylate, ethyl methacrylate, n-butyl acrylate, tert-butyl acrylate);
B2b2: from 5 to 50% by weight, preferably from 20 to 35% by weight, particularly preferably from 20 to 25% by weight, based on the graft shell B2b, of a monomer B2b2 selected from acrylonitrile and mixtures of acrylonitrile with at least one further monomer selected from methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide);
where the entirety of graft base B2a and graft shell B2b provides precisely 100% by weight.

In a preferred embodiment, polymer B is an acrylonitrile-butadiene-styrene copolymer (ABS), for example Terluran® or Novodur® (INEOS Styrolution).

In another preferred embodiment, the amorphous polymer B is a styrene-acrylonitrile copolymer (SAN), in particular a non-rubber-modified styrene-acrylonitrile copolymer, for example Luran® (INEOS Styrolution), and/or an α-methylstyrene-acrylonitrile copolymer (AMSAN) for example Luran® High Heat (INEOS Styrolution).

SAN copolymers and AMSAN copolymers generally comprise from 18 to 35% by weight, preferably from 20 to 32% by weight, particularly preferably from 22 to 30% by weight, of acrylonitrile (AN) and from 82 to 65% by weight, preferably from 80 to 68% by weight, particularly preferably from 78 to 70% by weight, of styrene (S) or α-methylstyrene (AMS), where the entirety of styrene or α-methylstyrene and acrylonitrile provides 100% by weight.

The average molar mass $M_w$ of the SAN and AMSAN copolymers used is generally from 80 000 to 350 000 g/mol, preferably from 100 000 to 300 000 g/mol and particularly preferably from 120 000 to 250 000 g/mol.

In a preferred embodiment, the amorphous polymer B is at least one SAN copolymer comprising (preferably consisting of):
from 50 to 95% by weight, preferably from 65 to 80% by weight, particularly preferably from 69 to 80% by weight, with particular preference from 71 to 80% by weight, based on the polymer B, of at least one monomer selected from styrene, α-methylstyrene and mixtures of styrene and α-methylstyrene, and
from 5 to 50% by weight, preferably from 20 to 35% by weight, particularly preferably from 20 to 31% by weight, with particular preference from 20 to 29% by weight, based on the polymer B of a monomer selected from acrylonitrile and mixtures of acrylonitrile and methacrylonitrile.

In another preferred embodiment, the amorphous polymer B is a transparent methyl methacrylate-acrylonitrile-butadiene-styrene copolymer (MABS), in particular at least one Terlux® (INEOS Styrolution) or Toyolac® (Toray) copolymer.

Component C

The thermoplastic polymer powder P of the invention comprises, as component C, at least one compatibilizer, where the compatibilizer is a copolymer selected from the group consisting of styrene-acrylonitrile-maleic anhydride terpolymers, styrene-N-phenylmaleimide-maleic anhydride terpolymers and methyl methacrylate-maleic anhydride copolymers. Preference is given, as compatibilizer C, to a styrene-acrylonitrile-maleic anhydride terpolymer and/or a styrene-N-phenylmaleimide-maleic anhydride terpolymer.

The quantity of the compatibilizer C in the polymer blend of the invention is from 0.1 to 25% by weight, preferably from 1 to 20% by weight, often from 1 to 15% by weight, preferably from 2 to 10% by weight. With particular preference, quantities of C are from 3 to 10% by weight, often from 4 to 7% by weight.

In particular, the quantity of the compatibilizer C comprised in the polymer powder P is in the range from 0.1 to 15% by weight, preferably from 1 to 10% by weight, based on the entire polymer powder P.

WO 98/27157 describes suitable methyl methacrylate-maleic anhydride copolymers comprising methyl methacrylate, maleic anhydride and optionally a further vinylically copolymerizable monomer, and also use of these as compatibilizers.

The amino or carboxy terminal groups of the polyamides generally react with the functional groups of the co- and terpolymers mentioned, thus producing copolymers in situ which provide compatibility between the styrene copolymer phase and the polyamide phase. These polymer mixtures with modified interface are generally termed polymer alloys (L.A. Utracki, "Polymer Alloys and Blends", Hanser Verlag, 1989). These compatibilizers in particular contribute to the improvement of mechanical properties such as tensile strength and impact resistance.

The molar masses $M_w$ of the copolymers used as compatibilizers C are generally in the range from 30 000 to 500 000 g/mol, preferably from 50 000 to 250 000 g/mol, in particular from 70 000 to 200 000 g/mol, determined by GPC with use of tetrahydrofuran (THF) as eluent and with polystyrene calibration.

The copolymers used as compatibilizers C can be produced in a known manner by free-radical polymerization of the corresponding monomers. The polymerization can take place in suspension, emulsion, or solution, or as bulk polymerization. The free-radical polymerization can be initiated in a known manner thermally, by light, or preferably by means of free-radical initiators, e.g. by peroxides such as benzoyl peroxide. An example of a suitable production method is solution polymerization, where the monomer components of the copolymer, e.g. styrene, maleic anhydride and acrylonitrile, are dissolved in a suitable solvent, e.g. methyl ethyl ketone (MEK). One, or optionally more, chemical free-radical initiator(s) is/are added to this solution. Examples of preferred initiators are peroxides. The mixture is then polymerized at elevated temperature for a number of hours. The solvent and the unreacted monomers can then be removed in a known manner. An example of a production process is moreover explained in more detail in WO 2005/040281, page 10, line 31 to page 11, line 8.

The quantity of maleic anhydride (MA) in the styrene-acrylonitrile-maleic anhydride terpolymer or in the styrene-N-phenylmaleimide-maleic anhydride terpolymer can vary widely and is generally from 0.2 to 4% by weight, preferably from 0.4 to 3% by weight, particularly preferably from 0.8 to 2.3% by weight, based on the entire terpolymer. Within this range particularly good mechanical properties are achieved in relation to tensile strength and impact resistance.

The styrene-to-acrylonitrile ratio in the styrene-acrylonitrile-maleic anhydride terpolymer is preferably in the range from 80:20 to 50:50. The styrene-N-phenylmaleimide ratio in the styrene-N-phenylmaleimide-maleic anhydride terpolymer is preferably in the range from 80:20 to 50:50. In order to improve the miscibility of the terpolymer or copolymer (compatibilizer C) with the polymers A and B it is preferable to select a quantity of styrene that corresponds to the quantity of vinyl monomers in the styrene copolymer B.

It is preferable to use, as compatibilizer C, at least one terpolymer based on styrene, acrylonitrile and maleic anhydride.

The proportion of acrylonitrile in the styrene-acrylonitrile-maleic anhydride terpolymer, based on the entire terpolymer, is preferably from 10 to 30% by weight, particularly preferably from 15 to 30% by weight, in particular from 20 to 25% by weight. In a preferred embodiment, the thermoplastic polymer powder P of the invention preferably comprises, as component C, from 0.1 to 15% by weight, preferably from 4 to 10% by weight, particularly from 3 to 7% by weight, of at least one terpolymer based on styrene, acrylonitrile and maleic anhydride.

It is moreover also possible to use styrene-N-phenylmaleimide-maleic anhydride terpolymers which are described by way of example in EP-A-0 784 080, DE-A-100 24 935, and also DE-A-44 07 485 (in this case component B on pages 6 and 7).

Component D

The thermoplastic polymer powder P of the invention can optionally comprise at least one additive and/or at least one auxiliary as further component D. The quantity of component D comprised in the polymer powder is from 0 to 5% by weight, often from 0 to 3% by weight, frequently from 0.1 to 3% by weight.

Substances that can be used as additives or auxiliaries are the polymer additives known to the person skilled in the art and described in the prior art (e.g. Plastics Additives Handbook, ed. Schiller et al., 6$^{th}$ edn., 2009, Hanser). The additive and/or auxiliary can be added either before the compounding procedure (mixing of the polymeric components A, B and C in the melt) has ended or else before or after the mechanical comminution of the polymer.

It is preferable that the optional component D is selected from the group consisting of antioxidants, UV stabilizers, stabilizers to counter decomposition by heat, peroxide-decomposing substances, antistatic agents, lubricants, powder-flow aids, mold-release agents, nucleating agents, plasticizers, fibrous or pulverulent fillers, fibrous or pulverulent reinforcing agents, (glass fibers, carbon fibers, etc.) and colorants, such as dyes and pigments.

Examples of lubricants and mold-release agents, quantities used of which can be generally up to 1% by weight, are long-chain fatty acids such as stearic acid or behenic acid, salts thereof (e.g. Ca stearate or Zn stearate) or esters (e.g. stearyl stearate or pentaerythritol tetrastearate), and also amide derivatives (e.g. ethylenebisstearylamide). Quantities up to 0.1% by weight of mineral-based antiblocking agents can be added to the molding compositions of the invention in order to improve processing. Examples that may be mentioned are amorphous or crystalline silica, calcium carbonate and aluminum silicate.

Additives with particularly good suitability for improving the flowability of the polymer powder are silicon dioxide nanoparticle powders (e.g. Aerosil® from Evonik) or silicone additives (e.g. Genioplast® from Wacker). In a preferred embodiment, the thermoplastic polymer powder P comprises from 0.01 to 5% by weight, preferably from 0.1 to 3% by weight, of at least one silicon dioxide nanoparticle powder or silicone additive as additive D.

By way of examples, quantities of up to 5% by weight, preferably up to 2% by weight, of mineral oil, preferably medicinal white oil, can be used as processing aid.

Examples of suitable fillers and reinforcing agents are carbon fibers, glass fibers, amorphous silica, calcium silicate (wollastonite), aluminum silicate, magnesium carbonate, calcium carbonate, barium sulfate, kaolin, chalk, powdered quartz, mica and feldspar.

The thermoplastic polymer powder P typically comprises a quantity in the range from 0 to 5% by weight of additives and/or auxiliaries, preferably from 0 to 3% by weight, in particular from 0.1 to 5% by weight, more preferably from 0.5 to 3% by weight, based on the entire polymer powder P. When optional component D is present, the upper limits of components A and/or B in the polymer powder P can be adjusted correspondingly (e.g. from 10 to 84.9% by weight and, respectively, from 10 to 86.9% by weight of A or B, based on polymer powder P).

Optional component D can be added during mixing of the polymeric components A, B and C (compounding), after the compounding procedure, during mechanical comminution, or after mechanical comminution of the polymer.

The viscosity of the thermoplastic polymer powder P at shear rates of from 1 to 10 1/s and at temperatures of 250° C. is typically not higher than $1\times10^5$ Pa*s. The melt volume flow rate of the polymer powder P (MVR, measured in accordance with ISO 1133 at 220° C. with 10 kg load) is typically more than 6 cm$^3$/10 min.

For selective laser sintering it is advantageous to use a polymer powder with controlled particle size. The $D_{50}$ median particle diameter of the thermoplastic polymer powder P of the invention is in the range from 5 to 200 µm, preferably from 5 to 150 µm, with particular preference from 20 to 100 µm.

Preference is also given to a range of from 30 to 80 µm, more preferably from 10 to 100 µm, more preferably from 20 to 90 µm. Particle sizes and particle size distributions can be determined by the known methods, e.g. sieve analysis, light-scattering measurement, or ultracentrifuge (described by way of example in W. Scholtan, H. Lange: Kolloid Z. u. Z. Polymere 250, pp. 782-796, 1972).

The $D_{50}$ median particle diameter is the diameter that divides the cumulative distribution of the particle volumes into two portions of equal size; this means that 50% of the particles are larger than, and 50% are smaller than, the diameter $D_{50}$. At constant density, the proportion by volume also corresponds to the proportion by mass. The $D_{90}$ value is the particle size at which, based on volume or on mass, 90% of the particles are smaller than the stated value. In a preferred embodiment, the $D_{90}$ particle diameter of the thermoplastic polymer powder P of the invention (preferably based on the proportion by volume) is less than 200 µm, preferably less than 180 µm. In a preferred embodiment, the thermoplastic polymer powder P of the invention comprises less than 1% by weight of particles with diameter greater than 200 µm, preferably greater than 180 µm. In a preferred embodiment, the thermoplastic polymer powder P of the invention comprises a proportion by weight greater than 80%, preferably greater than 90%, of particles with diameter smaller than 100 µm, preferably smaller than 80 µm.

In another preferred embodiment, the thermoplastic polymer powder P of the invention has a multimodal particle size distribution. A multimodal particle size distribution is typically a particle size distribution having more than one maximum. The particle size distribution can preferably have two, three or more maxima. In a preferred embodiment, the thermoplastic polymer powder P of the invention has a bimodal particle size distribution (i.e. a particle size distribution with two maxima). One particle size maximum is at a value in the range from 20 to 100 µm, preferably in the range from 30 to 80 µm, and another particle size maximum is at a value in the range from 1 to 30 µm, preferably in the range from 5 to 20 µm.

A preferred embodiment provides thermoplastic polymer powders P which are suitable for the production of translucent or transparent components by means of selective laser sintering.

With use of the polymer powders P of the invention it is moreover possible to produce translucent or transparent components via suitable selection of components A (semicrystalline polymer), B (amorphous polymer) and C (compatibilizer). One way of producing a transparent component is to use what is known as a nanoblend where although the individual polymer constituents can have a different refractive index the dispersion of the polymer constituents is so fine that the domain sizes are smaller than the wavelength of visible light. Light passing through the material is then generally no longer subject to scattering at the domain boundaries, and the component appears transparent. These nanoblends made of polyamide and SAN or ABS can be produced via suitable selection of the compatibilizer C.

For the purposes of the present invention, the meaning of the expression "transparent" or "transparent component" is that the light permeability (transparency) of a component, typically measured in accordance with ASTM D1003 (Standard Test Method for Haze and Luminous Transmittance of Transparent Plastics) on a sample of thickness 4 mm is greater than or equal to 85%.

For the purposes of the present invention, the expression "translucent" or "translucent component" means that the light permeability (transparency) of a component, typically measured in accordance with ASTM D1003 (Standard Test Method for Haze and Luminous Transmittance of Transparent Plastics) on a sample of thickness 4 mm is in the range from 1 to 90%, preferably from 5 to 85%, particularly preferably 5 to 84%, more preferably from 50 to 84%.

In a preferred embodiment, the invention provides a thermoplastic polymer powder P as described above comprising
- (A) from 30 to 66% by weight, preferably from 30 to 65.9% by weight, with particular preference from 30 to 63% by weight, based on the entire polymer powder P, of at least one polyamide selected from polycaprolactam (PA6), polyhexamethyleneadipamide (PA6,6); polyundecanolactam (PA11) and polylaurolactam (polydodecanolactam, PA12), as semicrystalline polymer A;
- (B) from 30 to 66% by weight, preferably from 30 to 65.9% by weight, with particular preference from 30 to 63% by weight, based on the entire polymer powder P, of at least one polymer selected from styrene-butadiene block copolymers (SBC), acrylonitrile-butadiene-styrene copolymers (ABS), styrene-acrylonitrile copolymers (SAN), α(alpha)-methylstyrene-acrylonitrile copolymers (AMSAN), acrylate-styrene-acrylonitrile copolymers (ASA), methyl methacrylate-acrylonitrile-butadiene-styrene copolymers (MABS), methyl methacrylate-butadiene-styrene copolymers (MBS), styrene-methyl methacrylate copolymers (SMMA), amorphous polystyrene (PS) and impact-modified polystyrene (HIPS), as amorphous polymer B; preferably at least one styrene-acrylonitrile copolymer (SAN) and/or acrylonitrile-butadiene-styrene copolymer (ABS), as amorphous polymer B;
- (C) from 4 to 10% by weight, based on the entire polymer powder P, of a styrene-acrylonitrile-maleic anhydride terpolymer with maleic anhydride content in the range from 0.4 to 3% by weight, particularly preferably from 0.8 to 2.3% by weight, based on the entire terpolymer, as compatibilizer C;
- (D1) from 0.1 to 3% by weight of at least one silicon dioxide nanoparticle powder or silicone additive as powder-flow aid, and
- (D2) optionally from 0 to 3% by weight, based on the entire polymer powder P, of at least one further additive and/or auxiliary as further component D.

Process for the Production of the Thermoplastic Polymer Powder P

The present invention moreover provides a process for the production of the thermoplastic polymer powder P of the invention, comprising the following steps:

i) provision of a solid mixture comprising (preferably consisting of) components A, B, C and optionally D, preferably obtained via mixing of components A, B and C (optionally D) in the melt, for example in an extruder, and cooling of the melt;

ii) mechanical comminution of the solid mixture, in particular by means of grinding, micronizing, freeze-grinding (cryogenic grinding) or jet-milling;

where a thermoplastic polymer powder P is obtained with D50 median particle diameter in the range from 5 to 200 µm, preferably from 5 to 150 µm, with particular preference from 20 to 100 µm, particularly preferably from 30 to 80 µm.

Step i) preferably comprises the mixing (compounding) of components A, B and C in the liquid state, preferably in the melt, in particular at a temperature in the range from 200 to 250° C. The mixing of components A, B and C, and also optionally D, is typically carried out in a suitable extruder, for example a twin-screw extruder. In principle, it is also possible to use other known mixing devices, for example Brabender mixers or Banbury mixers. The person skilled in the art will select the compounding conditions, for example the compounding temperature, as required by the components used, in particular the polymeric components A and B. It is advantageous here to maximize the intensity of mixing of components A, B and C, and also optionally D.

Step i) preferably comprises the cooling and pelletizing of the polymer mixture.

It is preferable that the mechanical comminution of the solid mixture in step ii) takes place by means of grinding, micronizing, freeze-grinding (cryogenic grinding) or jet-milling. Suitable processes for mechanical comminution, in particular by grinding, are described by way of example in Schmid, M., Selektives Lasersintern (SLS) mit Kunststoffen [Selective laser sintering (SLS) with plastics], pp. 105-113 (Carl Hanser Verlag, Munich, 2015).

It is often difficult to comminute thermoplastic polymers at room temperature to give very small particle sizes, because they tend to soften and cake as a result of heating during grinding. By cooling during the grinding procedure, for example by means of dry ice, liquid $CO_2$ or liquid nitrogen, it is possible to grind thermoplastic polymers to give very small particle sizes, because they then possess sufficient brittleness. The freeze-grinding (cryogenic grinding) process features a combination of very low temperatures and a mechanical grinding process. The process is described by way of example in Liang, S. B. et al. (Production of Fine Polymer Powders under Cryogenic Conditions, Chem. Eng. Technol. 25 (2002), pp. 401-405).

Selective Laser Sintering Process

The present invention moreover provides a process for the production of a three-dimensional component by means of selective laser sintering comprising the following steps:
- x) provision of a powder layer consisting of the thermoplastic polymer powder P of the invention, in a construction chamber;
- xi) localized melting by means of a directed beam of electromagnetic radiation, preferably by means of a laser beam, by means of infrared radiation or by means of UV radiation, followed by solidification of the thermoplastic polymer powder P in a defined region;

where the steps x) and xi) are repeated so that a three-dimensional component is obtained layer-by-layer via bonding of the regions of the molten and resolidified polymer.

The thickness of the powder layer is preferably in the range from 100 to 200 µm. Provision of the powder layer can be achieved with the aid of a doctor, of a roller or of another suitable device. After provision of the powder layer, a doctor or a roller is often used to remove the excess polymer powder.

In a typical procedure, after one implementation of the steps x) and xi) the construction chamber is lowered, and a new powder layer consisting of polymer powder P is provided thereto. A typical procedure uses layer-by-layer melting and hardening of the powder particles (sintering) to produce the component as bonded composite of the individual layers.

Examples of devices suitable for selective laser sintering and for related additive manufacturing processes are Formiga P 110, EOS P 396, EOSINT P 760 and EOSINT P 800 (EOS GmbH), 251P and 402P (Hunan Farsoon High-tech Co., Ltd), ProX SLS 500, sPro 140, sPro 230 and sPro 60 (3D Systems Corporation), M3 (Blueprinter) and Jet Fusion 3D (Hewlett Packard Inc.). In the case of the M3 (Blueprinter) and Jet Fusion 3D (Hewlett Packard Inc.) devices, the localized melting is achieved with the aid of infrared radiation.

Use of the Thermoplastic Polymer Powder P

The present invention moreover provides a use of the thermoplastic polymer powder P of the invention for the production of a three-dimensional component by means of selective laser sintering (SLS) or of related additive manufacturing processes.

The invention preferably provides the use for the production of a transparent or translucent component. The use preferably relates to the production of a transparent or translucent component through the use of a thermoplastic polymer powder P comprising
- (A) at least one polyamide selected from polycaprolactam (PA6), polyhexamethyleneadipamide (PA6,6); polyundecanolactam (PA11) and polylaurolactam (polydodecanolactam, PA12), as semicrystalline polymer A;
- (B) at least one styrene-acrylonitrile copolymer (SAN) and/or acrylonitrile-butadiene-styrene copolymer (ABS) as amorphous polymer B;
- (C) at least one compatibilizer C, selected from the group consisting of styrene-acrylonitrile-maleic anhydride terpolymers, styrene-N-phenylmaleimide-maleic anhydride terpolymers and methylmethacrylate-maleic anhydride copolymers;

where components A, B and C take the form of nanoblends.

The embodiments described in connection with the polymer powder P of the invention, e.g. in respect of components A, B, C and D, are correspondingly applicable to the processes of the invention and to the inventive use.

The resultant components can be used in a great variety of ways, for example as constituent of vehicles and of aircraft, of ships, of packaging, of sanitary items, of medical products, of input appliances and control elements, of laboratory equipment and of consumer goods, of machine parts, of household equipment, of furniture, of handles, of gaskets, of floorcoverings, of textiles, of agricultural equipment, of shoe soles, of vessels for the storage of foodstuffs and animal feed, of crockery, of cutlery, of filters, or of telephone equipment, or as prototype or pattern in industry, design and architecture.

FIG. 1 uses a photographic example (scale: 1 micrometer) to show how the domain size of a PA/SAN blend can be reduced by using a compatibilizer with the aim of obtaining transparent polymeric components. The left-hand image a) is the electron micrograph of a PA/SAN blend without compatibilizer C. The right-hand image b) is the electron micrograph of a PA/SAN blend with a styrene-acrylonitrile-maleic anhydride terpolymer as compatibilizer C.

The present invention is explained in more detail via the examples, figures and claims that follow.

EXAMPLES 1.1 Components Used

The following semicrystalline polymers A1 to A4 were used as component A:
A1 PA12 (Vestosint® 1111, Evonik, Germany)
A2 PA6 (Ultramid® B3, BASF SE, Ludwigshafen),
A3 PLA (Ingeo 2500HP, NatureWorks) and
A4 Syndiotactic polystyrene (XAREC, Idemitsu, Japan)
Component B1 used is Terluran® (INEOS Styrolution, Frankfurt), a free-flowing, impact-resistant acrylonitrile-butadiene-styrene polymer (ABS) with a melt volume flow rate (220° C./10 kg load, ISO 1133) of about 35 $cm^3$/10 min.

Component B2 used is Luran® (INEOS Styrolution, Frankfurt), a free-flowing, impact-resistant styrene-acrylonitrile copolymer (SAN) with a melt volume flow rate (220° C./10 kg load, ISO 1133) of about 7 cm$^3$/10 min.

Component B3 used is an impact-resistant amorphous polystyrene (HIPS) (INEOS Styrolution, Frankfurt) with a melt volume flow rate (220° C./10 kg load, ISO 1133) of about 4 cm$^3$/10 min.

Component C used is an acrylonitrile-maleic anhydride terpolymer (SAN MA) with a proportion of 2.1% by weight of maleic anhydride (INEOS Styrolution).

Semicrystalline component A, amorphous component B and the compatibilizer C are mixed in a twin-screw extruder at a melt temperature of from 240° C. to 260° C. The resultant compounded material is pelletized after cooling and solidification of the melt.

The resultant solid polymer mixtures are micronized by conventional processes, for example by grinding, cryogenic grinding, jet-milling or other known processes. They are tested for suitability for selective laser sintering.

Table 1 below collates the polymer mixtures.

TABLE 1

Polymer powder compositions

| Test | A1 | A2 | A3 | A4 | B1 | B2 | B3 | C |
|---|---|---|---|---|---|---|---|---|
| P1 | 35 | | | | 60 | | | 5 |
| P2 | | 35 | | | 60 | | | 5 |
| P3 | | | 35 | | 60 | | | 5 |
| P4 | | | | 35 | 60 | | | 5 |
| P5 | 47.5 | | | | 47.5 | | | 5 |
| P6 | 47.5 | | | | | 47.5 | | |
| P7 | | 47.5 | | | 47.5 | | | 5 |
| P8 | | 47.5 | | | | 47.5 | | |
| P9 | | | 47.5 | | 47.5 | | | 5 |
| P10 | | | | 47.5 | 47.5 | | | 5 |
| P11 | | | | 47.5 | | | 47.5 | 5 |
| P12 | 60 | | | | 35 | | | 5 |
| P13 | | 60 | | | 35 | | | 5 |
| P14 | | | 60 | | 35 | | | 5 |
| P15 | | | | 60 | 35 | | | 5 |
| V1 | 37.5 | | | | 67.5 | | | 0 |
| V2 | 50 | | | | 50 | | | 0 |
| V3 | 67.5 | | | | 37.5 | | | 0 |

The compositions V1 to V3 are comparative examples (without addition of the compatibilizer C).

Various selective laser sintering processes were carried out with these compositions.

What is claimed is:

1. A thermoplastic polymer powder P comprising
   (A) from 10 to 89.9% by weight, based on the entire polymer powder P, of at least one semicrystalline polymer A;
   (B) from 10 to 89.9% by weight, based on the entire polymer powder P, of at least one amorphous polymer B, where the amorphous polymer B is at least one polymer selected from the group consisting of styrene-butadiene block copolymers, acrylonitrile-butadiene-styrene copolymers, styrene-acrylonitrile copolymers, α(alpha)-methylstyrene-acrylonitrile copolymers, acrylate-styrene-acrylonitrile copolymers, methyl methacrylate-acrylonitrile-butadiene-styrene copolymers, methyl methacrylate-butadiene-styrene copolymers, styrene-methyl methacrylate copolymers, amorphous polystyrene, and impact-modified polystyrene;
   (C) from 0.1 to 15% by weight, based on the entire polymer powder P, of at least one compatibilizer C, selected from the group consisting of styrene-acrylonitrile-maleic anhydride terpolymers, styrene-N-phenyl-maleimide-maleic anhydride terpolymers, and methyl-methacrylate-maleic anhydride copolymers;
   (D) optionally from 0 to 5% by weight, based on the entire polymer powder P, of at least one additive and/or auxiliary;
   where the sum of the %s by weight of components A, B, C, and optionally D is 100% by weight;
   where the semicrystalline polymer A, the amorphous polymer B, and the compatibilizer C are present in the form of a polymer blend;
   and where the $D_{50}$ median particle diameter of the thermoplastic powder P is in the range from 5 to 200 μm.

2. The thermoplastic polymer powder P of claim 1, wherein the semicrystalline polymer A is at least one polymer selected from the group consisting of polyamides, polyetherketones, polylactides, polybutyleneterephthalate, polyethylene, polypropylene, and syndiotactic polystryene.

3. The thermoplastic polymer powder P of claim 1, wherein the semicrystalline polymer A is at least one polyamide selected from the group consisting of PA6 (polycaprolactam); PA6,6 (polyhexamethyleneadipamide); PA4,6 (polytetramethyleneadipamide); PA5,10 (polypentamethyleneadipamide); PA6,10 (polyhexamethylenesebacamide); PA7 (polyeneantholactam); PA11 (polyundecanolactam); and PA12 (polylaurolactam).

4. The thermoplastic polymer powder P of claim 1, wherein the amorphous polymer B is at least one styrene polymer or styrene copolymer which has a volume melt flow index in the range from 2 to 60 cm$^3$/10 min, measured in accordance with ISO 1133, at 220° C. and with a load of 10 kg.

5. The thermoplastic polymer powder P of claim 1, wherein the $D_{90}$ particle diameter of the polymer powder P is less than 200 μm.

6. The thermoplastic polymer powder P of claim 1, comprising
   (A) from 30 to 66% by weight, based on the entire polymer powder P, of at least one polyamide selected from the group consisting of polycaprolactam PA6; polyhexamethyleneadipamide PA6,6; polyundecanolactam PA11; and polylaurolactam PA12, as semicrystalline polymer A;
   (B) from 30 to 66% by weight, based on the entire polymer powder P, of at least one polymer selected from the group consisting of styrene-butadiene block copolymers, acrylonitrile-butadiene-styrene copolymers, styrene-acrylonitrile copolymers, α(alpha)-methylstyrene-acrylonitrile copolymers, acrylate-styrene-acrylonitrile copolymers, methyl methacrylate-acrylonitrile-butadiene-styrene copolymers, methyl methacrylate-butadiene-styrene copolymers, styrene-methyl methacrylate copolymers, amorphous polystyrene, and impact-modified polystyrene, as amorphous polymer B;
   (C) from 4 to 10% by weight, based on the entire polymer powder P, of a styrene-acrylonitrile-maleic anhydride terpolymer with maleic anhydride content in the range from 0.4 to 3% by weight, based on the entire terpolymer, as compatibilizer C;
   (D1) from 0.1 to 3% by weight, based on the entire polymer powder P, of at least one silicon dioxide nanoparticle powder or silicone additive as powder-flow aid; and
   (D2) optionally from 0 to 3% by weight, based on the entire polymer powder P, of at least one further additive and/or auxiliary as further component D.

7. A process for the production of a thermoplastic polymer powder P of claim 1, comprising the following steps:
  i) provision of a solid mixture comprising components A, B, C, and optionally D;
  ii) mechanical comminution of the solid mixture, whereupon a thermoplastic polymer powder P is obtained which has a $D_{50}$ median particle diameter in the range from 5 to 200 µm.

8. The process of claim 7, wherein step i) comprises the mixing of components A, B, and C in the liquid state at a temperature in the range from 200 to 250° C.

9. The process of claim 7, wherein the mechanical comminution of the solid mixture in step ii) is achieved by grinding, micronizing, freeze-grinding, or jet-milling.

10. A process for the production of a three-dimensional component by selective laser sintering comprising the steps of:
  x) provision of a powder layer consisting of the thermoplastic polymer powder P of claim 1 in a construction chamber;
  xi) localized melting by a directed beam of electromagnetic radiation, followed by solidification of the thermoplastic polymer powder P in a defined region;
where the steps x) and xi) are repeated so that a three-dimensional component is obtained layer-by-layer via bonding of the regions of the molten and resolidified polymer.

11. The process of claim 10, wherein the thickness of the powder layer is in the range from 100 to 200 µm.

12. The process of claim 10, wherein the process involves the production of a transparent or translucent component.

\* \* \* \* \*